April 19, 1949. E. G. LIVESAY 2,467,940
PORTABLE TORCH CARRIAGE
Filed July 20, 1944 2 Sheets-Sheet 1
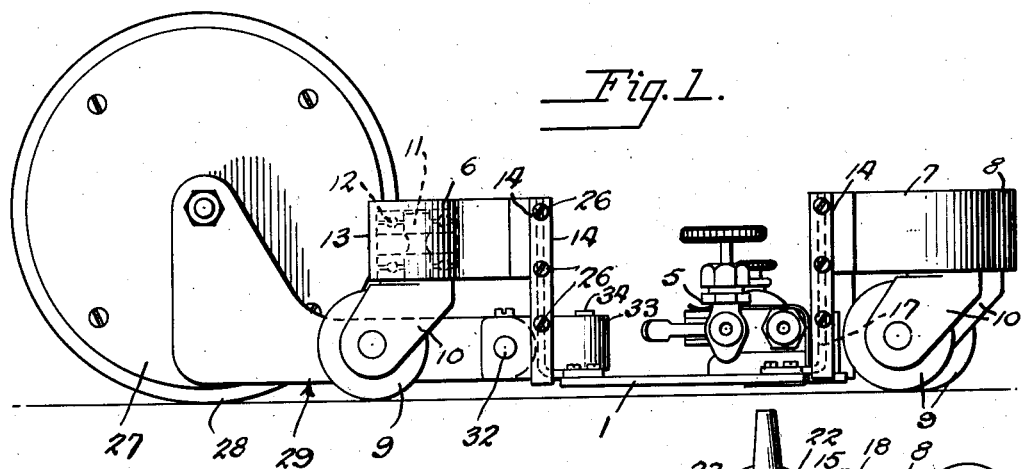
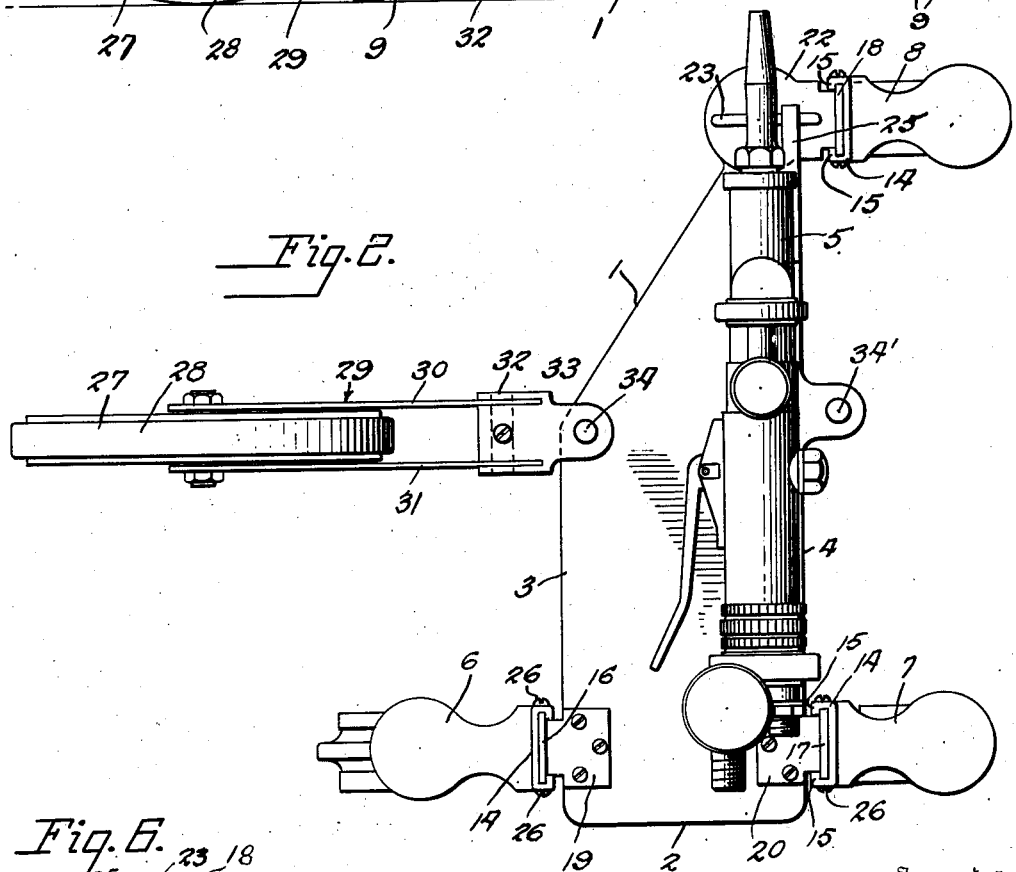
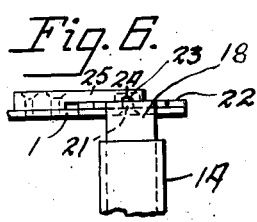
Inventor
E. G. Livesay April 19, 1949.  E. G. LIVESAY  2,467,940
PORTABLE TORCH CARRIAGE
Filed July 20, 1944                           2 Sheets-Sheet 2
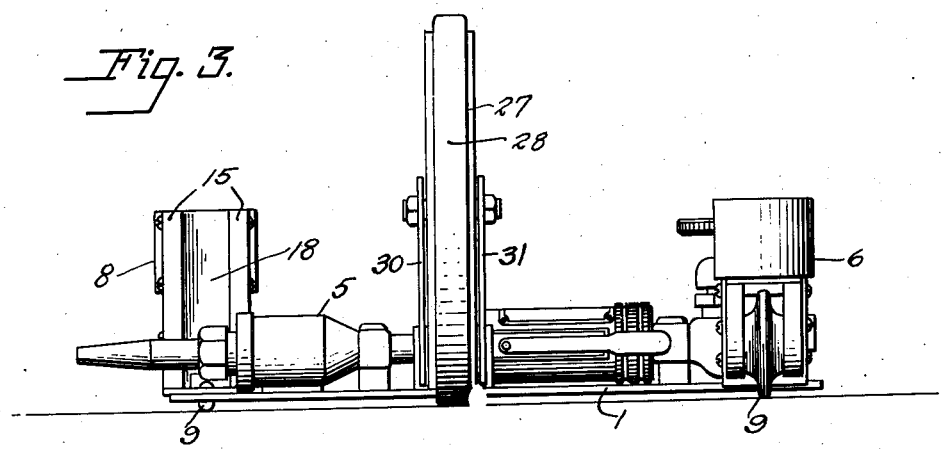
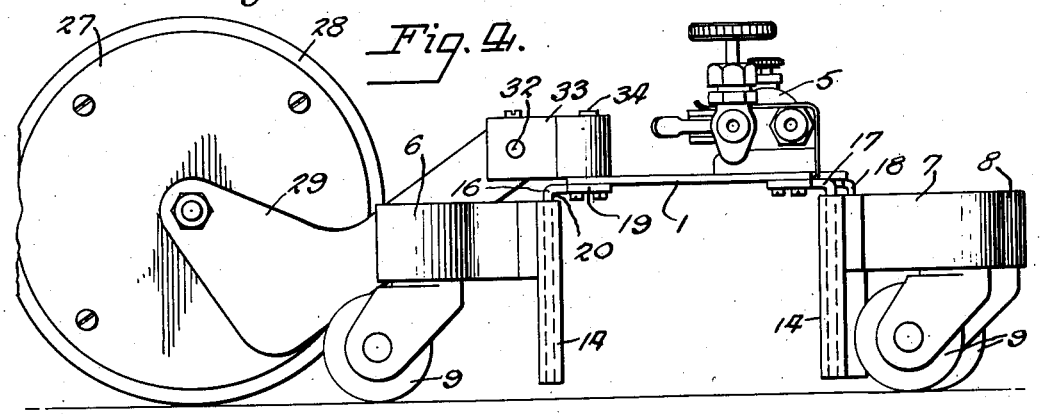
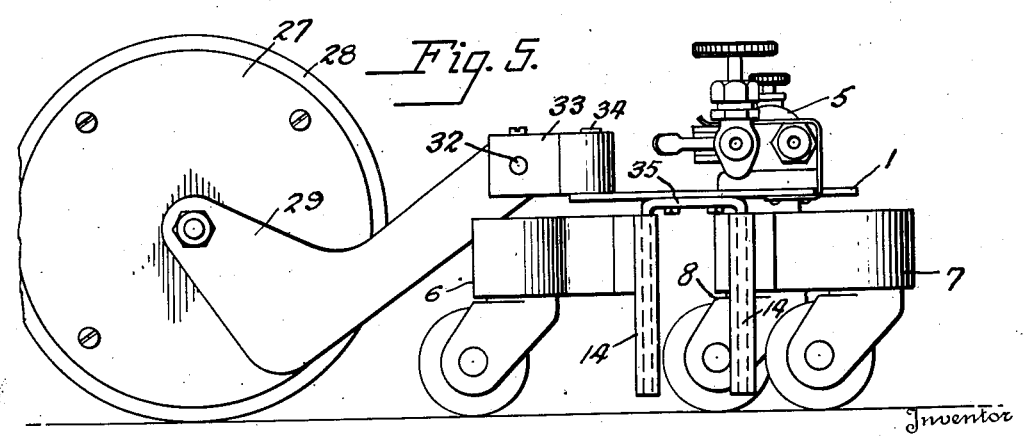
Inventor
E. G. Livesay Patented Apr. 19, 1949

2,467,940

UNITED STATES PATENT OFFICE 2,467,940

PORTABLE TORCH CARRIAGE

Everett G. Livesay, New Orleans, La.

Application July 20, 1944, Serial No. 545,753

5 Claims. (Cl. 266—23)

This invention relates to a novel carriage for supporting a cutting torch.

The general object of the invention is to provide a torch supporting platform mounted upon wheel or roller units, with cooperating adjusting means carried by said platform and roller units for adjusting said platform to different levels, the adjusting means carried by said platform being alternatively reversely attachable with respect to the upper and lower faces of said platform whereby said platform may be established at alternative minimum datum levels, one near the bottom of said roller units, and the other near the top, providing a range of level adjustments above the upper datum, and a range of level adjustments above the lower datum extending substantially to the upper datum. Thus, the torch is capable of operating throughout a wide range of levels beginning close to the surface which supports the carriage.

Other objects of the invention will appear as the following description of a preferred and practical embodiment thereof proceeds.

In the drawings which accompany and form a part of the following specification, and throughout the several figures of which the same reference numerals have been employed to designate identical parts:

Figure 1 is a side elevation showing the adjustable platform in its lower datum position;

Figure 2 is a plan view of the apparatus shown in Figure 1;

Figure 3 is a rear end view of the apparatus shown in Figure 1;

Figure 4 is a side elevation of the apparatus of Figure 1 with the platform in its upper datum position;

Figure 5 is a side elevation of a modified form of the invention;

Figure 6 is a detail showing the mounting and locking arrangement for the caster wheel nearest the torch tip.

Referring now in detail to the several figures, and adverting first to that form of the invention shown in Figures 1 to 4, inclusive, the carriage includes the preferably horizontal platform 1, which as shown, is of trapezoidal shape, having the end 2 perpendicular to the sides 3 and 4 and the opposite end converging towards an apex. The torch 5, as illustrated, is mounted horizontally upon the platform 1, adjacent the longer side 4 and parallel thereto, with its nozzle end adjacent the apical end of the platform. The specific shape of the platform and the position of the torch with respect thereto, as well as the means for securing the torch, are not critical to the invention.

The platform 1 is supported, as shown, at three spaced points by caster units which are generally similar. Two of these points of support are at the opposite sides 3 and 4 of the platform and adjacent the perpendicular end 2. The caster units at these points are designated by the reference characters 6 and 7. The other point of suspension is at the apical end of the platform, the caster unit at this point being designated by the numeral 8.

Each caster unit comprises a caster 9 journaled in a fork 10, the spindle 11 of which form is journaled in bearings 12, retained within a housing 13. Each housing carries a vertical channel member 14, having inturned spaced flanges 15. The platform 1, at the three points of support, has vertical tongue members 16, 17 and 18 detachably secured thereto. Said tongue members slide within the guideways afforded by the channel members 14. The tongue members 16 and 17 comprise the right angularly disposed portions 19 and 20, which as shown, are screwed into threaded holes which extend through the platform 1. The screws are symmetrically placed so that when desired, the tongue members 16 and 17 may be detached, reversed on the opposite face of the platform and screwed back into the same holes in reverse position.

The means for securing the tongue member 18, which cooperates with the caster unit 8, is somewhat different. This member is close to the nozzle of the torch, and in order to permit the torch to work in close places where any fixed position of the caster unit 8 would constitute an obstruction, it is preferred to mount the tongue member 18 rotatably with respect to the platform 1. This mounting comprises a bolt and nut 21 passing through registering apertures in the platform and right angularly deflected portion 22 of the tongue member 18. This permits the caster unit 8 to be fixed in the forward position shown in Figure 2, or in a position 180° displaced therefrom. In order to hold the caster unit in either of these set positions, the portion 22 of the tongue member 18 is provided with an upstanding rib 23, either end of which may be engaged in a notch 24 in the end of a locking pin 25, the latter being attached as by screws to the platform 1. The tongue member 18 may be alternatively fixed either on the upper or lower faces of the platform 1, and the locking pin 25 correspondingly shifted.

The channel members 14 of the several caster units and the tongue members associated therewith constitute adjusting means for supporting the platform 1 at different levels. The tongue members are locked in any positions of adjustment in the channel members 14, by means of set screws 26, which as shown, enter the sides of the channel members and bear against the tongue members.

In Figure 1, the platform 1 is shown as what is termed its lower datum level. By sliding the tongue members 16, 17 and 18 upwardly in the channel members 14, the platform 1 can be adjusted to any level within a range extending from its lower datum position, as shown, to a level adjacent the tops of the channel members 14. By removing the platform 1, together with the upstanding tongue members 16, 17 and 18, then detaching said tongue members and re-attaching them in depending position to the under face of the platform 1, the tongue members may then be slipped into the channel members 14 from the top, until the platform is brought to the level of the tops of the channel members 14. This position is termed the upper datum level of the platform 1. By adjustably sliding the tongue members upwardly within the channel members 14, the platform may be raised to any desired level above its upper datum position within a range limited by the length of the tongue members.

In a practical illustrative embodiment of the apparatus, the length of the tongue members and cooperating channel members is about three inches. Thus, an extreme range of six inches level adjustment is possible, beginning close to the surface upon which the casters rest.

For propelling the apparatus, a large hand wheel 27 is employed, having a frictional rim 28 of rubber or like material. The hand is rested upon this wheel and by slow rotation of the wheel the carriage is propelled with a steady motion. The wheel is pivotally mounted within a fork 29, consisting of the spaced side members 30 and 31, vertically swingable on a horizontal pin 32 in a block 33 hinged for horizontal movement upon a vertical pin 34 mounted upon the platform 1. A duplicate vertical pin 34' is mounted on the opposite side of the platform 1, so that the hand wheel can be interchanged to operate the carriage from either side. The swing of the fork 29 in a vertical plane is sufficient to permit the hand wheel to engage the surface upon which the carriage moves throughout all level adjustments of the platform 1.

Figure 5 shows a slight modification of the invention, in which the tongue members 16 and 17, shown in the first described form of the invention, are substituted by a single tongue member 35 of U-shaped form. The bight of this U-shaped member may be made as wide as desired. As shown, it brings the caster units beneath the platform, so that the lower datum position of the platform is eliminated and the level adjustments of said platform are confined to a range above its position as shown.

While I have in the above description disclosed what I believe to be a preferred and practical embodiment of the invention, it will be understood to those skilled in the art that variations in the construction and arrangement of parts are within the scope of the appended claims.

What I claim as my invention is:

1. Apparatus for flame-cutting vertical sheets horizontally in different planes comprising a platform, a torch support carried by said platform adapted to mount a torch with its nozzle directed laterally, roller units supporting said platform at spaced points, vertical guides carried by said roller units, tongues carried by said platform at said points of support slidable in said guides and alternatively attachable to said platform in vertical upstanding position above or vertical depending position below said platform, said tongues insertable in said guides respectively from the bottom or from the top for adjustably changing the level of said platform throughout a wide range, without inverting said platform.

2. Apparatus for flame-cutting vertical sheets horizontally in different planes comprising a platform, a torch support carried by said platform adapted to mount a torch with its nozzle directed laterally, roller units supporting said platform at spaced points, vertical guides carried by said roller units, tongues carried by said platform at said points of support slidable in said guides and being alternatively attachable to said platform in vertical upstanding position above or vertical depending position below said platform, said tongues insertable in said guides respectively from the bottom or from the top for adjustably changing the level of said platform throughout a wide range, without inverting said platform, said tongues and guides being the sole connection between said platform and roller units.

3. Apparatus for flame-cutting vertical sheets horizontally in different planes, comprising a platform, a torch support carried by said platform adapted to mount a torch with its nozzle directed laterally, roller units supporting said platform at spaced points, vertical cooperating slide and guide means at each point of support between said platform and the respective roller units, one of said cooperating slide and guide means at each point of support being alternatively attachable to said platform in vertical upstanding position above or vertical depending position below said platform and being telescopable with the corresponding cooperative elements carried by said roller units respectively from the bottom or from the top for adjustably changing the level of said platform throughout a wide range, without inverting said platform.

4. Apparatus for flame-cutting vertical sheets horizontally in different planes, comprising a platform, a torch support carried by said platform adapted to mount a torch with its nozzle directed laterally, roller units supporting said platform at spaced points, vertical cooperating slide and guide means at each point of support between said platform and the respective roller units for adjustably changing the level of said platform, an arm comprising sections articulated on a horizontal axis, one section being pivoted to said platform on a vertical axis, and a hand rotated traction wheel journaled in the other section for propelling said carriage, whereby said roller units afford the sole supporting means for said platform, and said wheel may be maintained in an erect position and thereby freely swingable in opposite lateral and opposite vertical directions, and relatively independent clamp means, one for each said unit adapted to maintaining its associated unit in slide and guide means in a predetermined position of adjustment.

5. Apparatus for flame-cutting vertical sheets horizontally in different planes, comprising a platform having one end convergent, a torch support carried by said platform adapted to mount a torch with its nozzle directed laterally in the direction of said convergent end, caster units supporting said platform at spaced points, one being at said convergent end, vertical guides carried by said caster units, tongues carried by said platform at said points of support slidably engaging said guides, said tongues being alternatively attachable to said platform in vertical upstanding position above or vertical depending position below said platform and being insertable in said guides respectively from the bottom or from the top for adjustably changing the level of said platform without inverting it, that tongue at the convergent end of said platform being rotatably adjustable to change the orientation of the corresponding caster unit, and cooperating means on said platform for fixing said tongue in positions of orientation 180° displaced.

EVERETT G. LIVESAY.

REFERENCES CITED

The following references are of record in the file of this patent:

UNITED STATES PATENTS

| Number | Name | Date |
|---|---|---|
| 932,740 | Wiss | Aug. 31, 1909 |
| 1,317,425 | Boyce | Sept. 30, 1919 |
| 1,718,192 | Crowe | June 18, 1929 |
| 1,785,071 | Coberly | Dec. 16, 1930 |
| 2,018,378 | Nass | Oct. 22, 1935 |
| 2,054,425 | Jones et al. | Sept. 15, 1936 |
| 2,102,560 | Kimmich | Dec. 14, 1937 |
| 2,190,091 | Wolfe | Feb. 13, 1940 |
| 2,293,853 | Rountree | Aug. 25, 1942 |

FOREIGN PATENTS

| Number | Country | Date |
|---|---|---|
| 220,670 | Great Britain | Aug. 25, 1924 |
| 539,216 | Germany | Nov. 26, 1931 |